3,533,801
METHOD FOR PRODUCING EXTRUDED PRODUCTS
Lavon G. Wenger, Sabetha, Kans., assignor to Wenger Manufacturing, Inc., Sabetha, Kans., a corporation of Kansas
Filed Apr. 20, 1967, Ser. No. 632,412
Int. Cl. A23l 1/10
U.S. Cl. 99—82     3 Claims

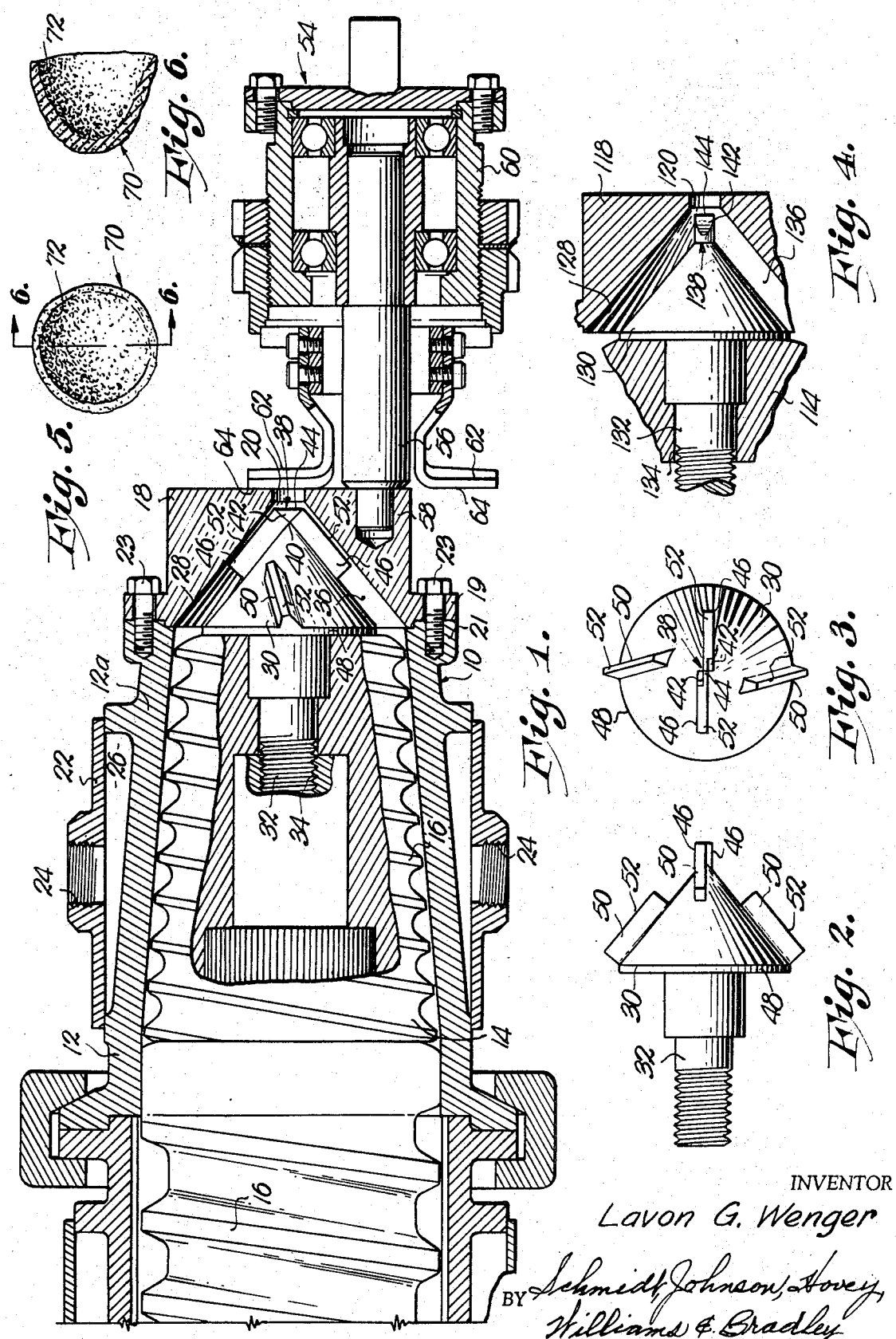

ABSTRACT OF THE DISCLOSURE

A cup shaped cereal product is produced by extruding a rod of cooked dough while forming a central line of weakness in the extruded rod. The rod is sliced into relatively thin discs as it emerges from the extruder. The thin discs then expand to produce a cup shaped product.

---

The instant invention relates to an extrusion method and apparatus and, in particular, to a method and an extruder for producing a product from a mass of moistened, farinaceous material capable of expanding after extrusion.

It is an object of the instant invention to provide novel product-forming structure for extruders adapted to process expandable material of the general type disclosed in U.S. Letters Pat. No. 3,117,006, of Jan. 7, 1964, entitled "Method of Increasing Palatability and Digestibility of a Cereal Product," assigned on its face to the assignee of the instant invention and in an application for U.S. Letters Pat., Ser. No. 467,171, filed June 3, 1965, now U.S. Pat. No. 3,385,709 entitled "Treatment of Oleaginous Substances" which, likewise, is assigned to the assignee of the instant invention.

It is the primary object of the instant invention to provide structure which causes each product produced by the extruder to expand into a shape which presents a concavity therein. In this respect, it is to be understood that the shape of a food product, and particularly those products which are classified generally as party snacks, is extremely important from a commercial standpoint.

Another very important object of the instant invention is to provide such structure wherein a mass of moistened farinaceous material is treated internally of the extruder and thereafter forced through a die block in a condition whereby, upon cutting of the extrudate into predetermined lengths by an external knife, the lengths automatically expand, under the influence of rapidly forming steam bubbles therein, into a cup-shaped product or other suitable configuration having a concavity.

In the drawing:

FIG. 1 is a partial, longitudinal, cross-sectional view of an extruder embodying the concepts and principles of the instant invention;

FIG. 2 is a side elevational view of the extruder screw head shown in FIG. 1 but rotated approximately 90°;

FIG. 3 is an end view of the head looking inwardly;

FIG. 4 is a fragmentary, cross-sectional view of a second form of the extruder screw head;

FIG. 5 is an end elevational view of a product produced by the method and apparatus of the invention; and FIG. 6 is a longitudinal, cross-sectional view taken along line 6—6 of FIG. 6.

A food product extruder embodying one form of the instant invention is broadly designated by the numeral 10 and includes a housing 12 and an extruder screw 14 similar to the housings and screws of the extruders illustrated in the above-referenced patent and application. However, it is to be appreciated that other types of food extruders might well be used in accordance with the principles and concepts of the invention, including those which have a straight barrel rather than the conically reduced housing end portion 12a illustrated in FIG. 1. Screw 14 is provided with mechanism in the nature of flights 16 which force a mass of moistened, farinaceous food material, capable of expanding after extrusion, toward a die block 18. If desired, mechanism other than that just above described may, however, be used to advance the material toward block 18. Block 18 has an annular flange 19 therearound attached, by fastening means 23, to a mating flange 21 located at one end of housing 12.

Extruder 10 may be utilized for processing food materials such as degerminated corn or wheat flours, rice flours, oat flours, or mixtures of the foregoing. Also, it has been found that mixtures of any of the above-mentioned flours and de-fatted vegetable protein flours produce excellent food products. Generally speaking, the food material processed by extruder 10 should contain sufficient moisture to cause expansion of the material upon extrusion, and it has been found that a moisture content at the time of extrusion in the range of 10% to 35% by weight produces excellent results. Additionally, it has been found that the temperature of the extrudate, as it is forced through an elongated extrusion hole 20 in block 18, should be approximately 300° F. to 500° F., while temperatures in the range of from 250° F. to 600° F. are acceptable. Furthermore, the pressures developed within extruder 10 at die block 18 should be above the vapor pressure of water at its extrusion temperature.

Housing 12 may be provided with an annular jacket 22 having inlet and outlet connections 24 to facilitate circulation of a heating fluid through a space 26 surrounding housing 12 for heating the material as it is moved toward block 18 by flights 16. Conversely, it has been found that, in many cases, a sufficient product-forming temperature is developed in the material by friction as it is compressed and forced toward block 18, as explained in the above patent and application. Jacket 22 may also be used for circulating cooling fluids to control the temperature of the food material if such temperature becomes excessive.

Block 18 is provided with a frusto-conical cavity 28 terminating at its smallest diameter at hole 20. Cavity 28 is aligned coaxially with screw 14 and complementally receives a head 30 which should be generally conical and be carried by screw 14 for rotation therewith within cavity 28. Means other than screw 14 may be used to rotate head 30, if desired. Head 30 is provided with a threaded shank 32 extending longitudinally of screw 14 and received in a threaded aperture 34 disposed centrally in the screw 14. It is to be understood that shank 32 and aperture 34 are reversed threaded with respect to the direction of rotation of screw 14 whereby head 30 is forced into tight engagement with screw 14 during the operation of extruder 10.

Block 18 is speced from head 30, presenting a material-receiving space 36 therearound within cavity 28. Manifestly, space 36 is located, as can be seen viewing FIG. 1, to receive material forced toward block 18 by screw 14 and channel the same toward hole 20.

Structure in the nature of a plate 38 is mounted on head 30 at the apex 40 thereof for rotation therewith between hole 20 and head 30. Plate 38 has a pair of opposed, flat, parallel surfaces 42 disposed on opposite sides of the axis of rotation of plate 38 and head 30. Surfaces 42 merge into an elongated end face 44 spaced from head 30. Face 44 traverses and is perpendicular to the axis of rotation of plate 38 and is substantially equal in length to the diameter of hole 20.

A pair of diametrically opposed blades 46 are rigid with head 30 and plate 38. Blades 46 extend from apex 40 toward the base 48 of head 30 and their longitudinal axes are parallel to an imaginary line extending from base 48 to apex 40 along the outer surface of head 30. A pair of diametrically opposed bars 50 are rigid with head 30 and extend thereon from base 48 toward apex 40. Bars 50 alternate with blades 46 about the circumference of head 30 and their longitudinal axes are disposed in angular relationship to the longitudinal axes of blades 46. Blades 46 and bars 50 have respective outermost edges 52 spaced from block 18.

Extruder 10 is provided with knife means 54 disposed exteriorly of hole 20 for cutting the extrusion emerging from the hole 20 into predetermined lengths. Knife means 54 include a rotatable shaft 56 journaled into support bearing structure 58 on the outer face of block 18. Shaft 56 is supported for rotation by a frame 60 and carries a plurality of knives 62 for rotation therewith. Manifestly, shaft 56 is connected with power means (not shown) for rotating the same and thereby moving knives 62 past the outer extremity of hole 20. Each knife 62 is provided with a wiping edge 64 disposed to traverse the outer surface of block 18 is substantially flush engagement therewith across hole 20.

Extruder 10 is provided with knife means 54 disposed exteriorly of hole 20 for cutting the extrusion emerging from the hole 20 into predetermined lengths. Knife means 54 include a rotatable shaft 56 journaled into support bearing structure 58 on the outer face of block 18. Shaft 56 is supported for rotation by a frame 60 and carries a plurality of knives 62 for rotation therewith. Manifestly, shaft 56 is connected with power means (not shown) for rotating the same and thereby moving knives 62 past the outer extremity of hole 20. Each knife 62 is provided with a wiping edge 64 disposed to traverse the outer surface of block 18 in substantially flush engagement therewith across hole 20.

Another form of the invention, which is the preferred form, is illustrated in FIG. 4 wherein the extruder screw 114 and the die block 118 having the hole 120 and cavity 128 therein are identical to screw 14 and block 18 of FIG. 1. In this preferred form, a frusto-conical head 130 has a threaded shank 132 which is threadably received within a threaded aperture 134 disposed centrally of screw 114. Head 130 is spaced from block 118 to present a frusto-conical space 136 therearound. Structure in the nature of an elongated, transversely circular rod 138 is rigid with head 130 for rotation therewith between hole 120 and head 130 and in this respect, rod 138 has its longitudinal axis coincident with its axis of rotation and the diameter of rod 138 is equal to the smallest diameter of head 130.

Rod 138 has a pair of opposed, flat surfaces 142 disposed on respective opposite sides of the axis of rotation thereof. Surfaces 142 converge as hole 120 is approached to present of flat face 144 at the outer end of rod 138 remote from head 130. In this connection it is to be appreciated that less than the diameter of hole 120; however, in all other respects, face 144 is identical to face 44 of FIGS. 1–3.

In operation, screw 14 (or screw 114) is rotated in a direction to move the mass of moistened food material through housing 12 toward block 18. Material leaving flights 16 is forced through space 36 (or space 136) in surrounding relationship to head 30 (or head 130). The mass in space 36 (or space 136), which is substantially anular in configuration, is squeezed together to present a line of juncture in the mass extending longitudinally of hole 20 (or hole 120) as the mass is forced therethrough. In this respect, blade 38 (or rod 138) acts on the mass radially outwardly of the axis of rotation of blade 38 (or rod 138) to retard substantial adhesion at the line of juncture and to create a line of weakness along the line of juncture. Manifestly, the surfaces 42 and face 44 of the blade 38 (or the surfaces 142 and the face 144 of the rod 38) act on the mass to form a hollow space therein as the mass enters hole 20 (or hole 120), and thus, the cohesive effects incident to the pressure on the mass are diminished. As soon as the mass moves beyond hole 20, the pressure is released therefrom, causing the moisture contained therein to be released as steam, whereupon the mass rapidly expands outwardly from the line of weakness. As knives 62 contact the mass to cut the same into predetermined lengths, edge 64 traverses hole 20 (or hole 120) to wipe the leading edge of the next to be extruded length and seal the line of weakness whereby, upon expansion, the length assumes a concavo-convex shape which is similar to the shape of the food product 70 illustrated in FIGS. 5 and 6.

FIGS. 5 and 6 generally illustrate the form of product 70 that is produced from my novel die assembly, characterized especially by the concavity 72 but also by its overall concavo-convex configuration which might well be called cup-shaped. For the most part, the concavity 72 is relatively deep, not merely a shallow depression, and the thickness of the wall of product 70 is rather uniform. Therefore, the dome shape of the outside of product 70 and the shape of concavity 72 are quite complemental. The apex of the product 70 is neither flat nor pointed; instead, it does have a definite apex while maintaining the arcuate configuration illustrated. Therefore, when increased in size, if desired, to be used as a party snack, as distinguished, for example, from a bit size breakfast cereal, the product 70 has definite advantages from the standpoint of dipping into or scooping out dip materials in ladle fashion.

Having thus described the invention, what is claimed as new and desired to be secured by Letters Patent is:

1. A method for producing a product from a mass of moistened, farinaceous material capable of expanding after extrusion, said method comprising:

extruding said mass into a continuous, rod-like extrusion, said extruding including the step of exerting pressure on the mass to advance the same and thereby raise the temperature of the mass as well as prevent substantial vaporization of the moisture content thereof;

forming a central line of weakness in said mass during advancement thereof whereby to present a hollow center in the extrusion after expansion of the latter;

severing the extrusion into predetermined lengths; and sealing one end of the next succeeding length during severance to present a concavo-convex product in each length having a concavity closed at said one end and open at the opposite end of each length.

2. The invention of claim 1, said step of forming a line of weakness comprising restricting the flow of said mass during advancement to an annular path circumscribing the central axis of advancement thereof.

3. The invention of claim 2, and working said mass radially outwardly along said axis within said path during said advancement to diminish the cohesive effects incident to said pressure at said axis and thereby create the line of weakness.

References Cited

UNITED STATES PATENTS 1,924,826    8/1933    Anderson _____ 99—82

LIONEL M. SHAPIRO, Primary Examiner

J. R. HOFFMAN, Assistant Examiner

U.S. Cl. X.R.

107—54